(No Model.)
J. B. ROBERTS.
CUTTING-OFF SAW
No. 420,103. Patented Jan. 28, 1890.
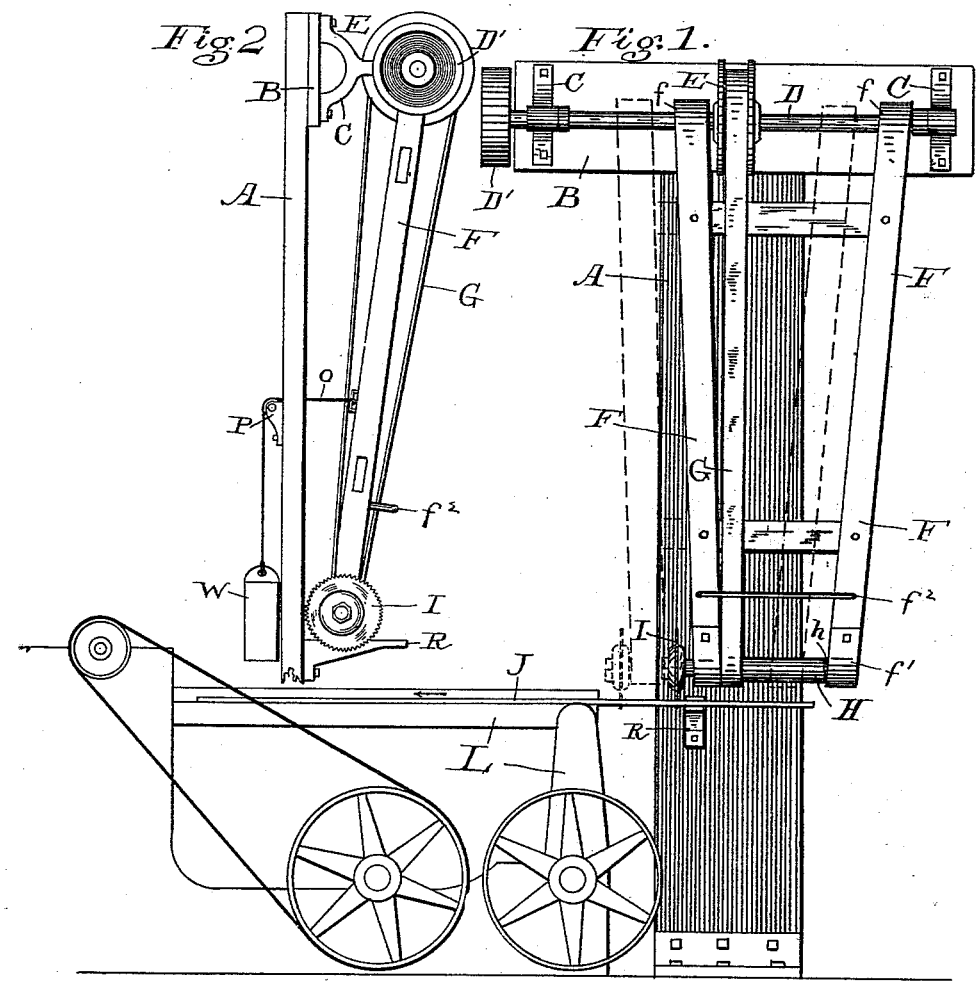
Witnesses:
Wm B Russell
E. D. Crust
Inventor:
Joshua B. Roberts

UNITED STATES PATENT OFFICE.

JOSHUA B. ROBERTS, OF HANOVER, MAINE.

CUTTING-OFF SAW.

SPECIFICATION forming part of Letters Patent No. 420,103, dated January 28, 1890.

Application filed May 10, 1889. Serial No. 310,232. (No model.)

*To all whom it may concern:*

Be it known that I, JOSHUA B. ROBERTS, a citizen of the United States, residing at Hanover, in the county of Oxford and State of Maine, have invented certain new and useful Improvements in Cutting-Off Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to machines for cutting off boards and other forms of long lumber, and it is particularly designed as an attachment to or to be used in connection with a cylinder-planer, tongueing-and-grooving machine, or other wood-working machine where long lumber is fed continuously through the machine from end to end.

In planing floor-boards and in other similar work it frequently happens that boards come along which for a considerable distance from one or both ends are unfit for use. In the absence of any ready means of trimming off these ends as they come to the planer they must be run through full length, thus wasting time in planing worthless material. Although this decreases the capacity of the planer, it would not be profitable to stop the machine and saw the board off by means of an ordinary cutting-off saw.

My invention is directed to remedying the difficulty by providing a cutting-off saw mounted on a suitable moving frame and so arranged as to be movable in a line parallel with the line of motion of the board. The saw can thus be moved out and made to cut off the board at any required point while the latter is in motion, the saw moving bodily forward with the board and across it at the same time.

I illustrate a practical form of my invention by means of the accompanying drawings, in which—

Figure 1 is a front view showing the front end of a board-planer. Fig. 2 is a side view, and Fig. 3 is a detail.

A is a standard, which is here shown as attached to the floor, or it obviously may be attached to the planer L or other wood-working machine. A cross-piece B is secured to the top of this standard, and attached to this are brackets C, in which is journaled the counter-shaft D. The counter-shaft is driven by means of a pulley D'. A swing-frame F is journaled to the counter-shaft by means of boxes $f$ on its upper end, and attached to the shaft D between the two side bars of the frame there is a flanged pulley E. The pulley E is secured to the shaft at a point next to that side bar of its frame which is nearest the planer, so that the frame is free to move along said shaft in the direction of the planer and back again. At the lower end of the frame is journaled, by means of the boxes $f'$, a saw-arbor $h$, on one end of which is a saw I, while on the body of the arbor is a long pulley H. A belt G passes over the flanged pulley E and the long pulley H. The frame is swung out by means of the handle $f^2$.

I provide for the return of the frame to its normal position by the cord O, which is attached to the back of it and passes over a pulley P. To the cord is secured a weight W. When the frame moves out of position in either direction, it is retracted by the weight W. A rest R is attached to the support A below the saw, and on this rest there is a flanged projection $r$, adapted to receive and retain the edge of the board to allow its forward end to be cut off.

The practical operation of my device is as follows, namely: As the boards come to the planer, if any of the forward ends need trimming they are lifted up, their ends being inserted under the projection $r$, and they are then sawed off. If the rear end of a board needs trimming, the frame is swung out at the proper point. As the saw cuts into the edge of the moving board the motion of the latter carries it along, and with it the frame is moved along the counter-shaft to the position shown by dotted lines in Fig. 1. When the board is cut across, the action of the weight W brings it back to its normal position, when it is ready to repeat the operation. It will be observed that when the parts are in rapid motion it requires very little force to move the frame on the counter-shaft. It is obvious that the flanged pulley may be on the saw-arbor and the long pulley on the counter-shaft, and many other modifications of my invention may be made without departing from its spirit. With a machine as here shown I am able to trim off either end of the boards in a very rapid manner, thus effecting a great saving of work for the machine, which will not be obliged to plane worthless material attached to the ends of the boards.

I claim—

1. The herein-described machine for cutting off longitudinally-moving boards, which consists of a frame movable across the path of said boards, and a cutting-off saw mounted on said frame and movable parallel to said path, whereby said boards may be cut off while in motion, substantially as shown.

2. The herein-described machine for cutting off longitudinally-moving boards, which consists of a frame movable across the path of said boards, a cutting-off saw mounted on said frame and movable parallel with the path of said boards, and a weight for returning said saw to its normal position, substantially as shown.

3. In a machine for cutting off boards, a swing-frame one end of which is journaled to a counter-shaft and is movable longitudinally thereon, a saw-arbor journaled to the opposite end of said frame, a saw thereon, a pulley on said counter-shaft and on said saw-arbor, one of said pulleys being flanged to retain a belt and the other being a long pulley, and a belt connecting said flanged pulley with said long pulley, in combination, substantially as shown.

4. In a machine for cutting off boards, a swing-frame journaled to a counter-shaft and movable longitudinally thereon, a cutting-off saw journaled to said frame, a pulley for rotating said saw, and a cord and weight for drawing said frame along said counter-shaft to return it to its normal position, substantially as shown.

In testimony whereof I affix my signature in presence of two witnesses.

JOSHUA B. ROBERTS.

Witnesses:
WILLIAM B. RUSSELL,
E. P. FROST.